(12) United States Patent
Kihlström

(10) Patent No.: US 11,084,671 B2
(45) Date of Patent: Aug. 10, 2021

(54) AUTOMATIC LOADING OF TRAYS INTO CARTS

(71) Applicant: Vacaw AB, Skara (SE)

(72) Inventor: Christer Kihlström, Skara (SE)

(73) Assignee: Vacaw AB, Skara (SE)

( * ) Notice: Subject to any disclaimer, the term of this patent is extended or adjusted under 35 U.S.C. 154(b) by 0 days.

(21) Appl. No.: 16/420,537

(22) Filed: May 23, 2019

(65) Prior Publication Data

US 2020/0079602 A1    Mar. 12, 2020

(30) Foreign Application Priority Data

May 25, 2018 (SE) .................................. 1850629-5

(51) Int. Cl.
*B65G 67/08* (2006.01)

(52) U.S. Cl.
CPC ...... *B65G 67/08* (2013.01); *B65G 2201/0258* (2013.01)

(58) Field of Classification Search
CPC ............ B65G 2201/0258; B65G 67/08; B65G 25/08; B65G 15/12; B65G 65/00
See application file for complete search history.

(56) References Cited

U.S. PATENT DOCUMENTS

| | | | |
|---|---|---|---|
| 1,759,005 A * | 5/1930 | Fuller | F26B 25/001 414/331.07 |
| 3,637,095 A | 1/1972 | Kampfer | |
| 4,277,216 A * | 7/1981 | Lindberg | B65G 65/00 414/331.09 |
| 4,621,969 A * | 11/1986 | Berghall | B65G 65/00 414/331.07 |

(Continued)

FOREIGN PATENT DOCUMENTS

| | | |
|---|---|---|
| CN | 102275744 A | 12/2001 |
| CN | 205526138 U | 8/2016 |

(Continued)

OTHER PUBLICATIONS

Extended European Search Report in Corresponding European Application No. 19173339.9, dated Oct. 24, 2019, 8 pages.

(Continued)

*Primary Examiner* — Kaitlin S Joerger
(74) *Attorney, Agent, or Firm* — FisherBroyles, LLP

(57) ABSTRACT

A method for automatic loading of trays into a cart, where the cart is adapted to receive trays at different vertical tray levels, comprises detecting the tray levels with a tray level sensor and lifting the cart with a lifting device from a floor to different vertical positions such that the tray levels in the cart will be at the same vertical level as a loading surface of a conveyer arrangement, which transports the trays to the cart on the loading surface. The method also comprises activating tray stoppers to stop the movement of the trays on the loading surface until the cart is at a correct vertical position, and deactivating the tray stoppers to allow the trays to be loaded into the cart when the cart is at a correct vertical position. The cart is lifted and loaded until all tray levels have been filled, and then the cart is again lowered to the floor. An apparatus for automatic loading of trays into a cart according to the method is also provided.

15 Claims, 8 Drawing Sheets

(56) References Cited

U.S. PATENT DOCUMENTS

| | | | | |
|---|---|---|---|---|
| 4,634,333 | A * | 1/1987 | Butterly, Jr. | B65G 65/00 187/251 |
| 5,271,334 | A * | 12/1993 | Sweet | B65G 57/00 104/102 |
| 5,437,537 | A * | 8/1995 | Sweet | B65G 57/00 198/456 |
| RE35,555 | E * | 7/1997 | Sjogren | B65G 57/24 104/162 |
| 5,882,174 | A | 3/1999 | Woerner et al. | |
| 5,927,927 | A * | 7/1999 | Anderson | B65G 65/00 414/331.16 |
| 6,056,496 | A * | 5/2000 | Myers | B65G 47/086 414/398 |
| 6,290,453 | B1 * | 9/2001 | Corniani | B65H 1/24 198/461.1 |
| 6,572,326 | B2 * | 6/2003 | Myers | B65G 47/086 198/429 |
| 6,793,214 | B2 * | 9/2004 | Loose | B65H 31/06 271/149 |
| 8,960,402 | B2 * | 2/2015 | Lee | G07F 19/203 194/206 |
| 9,751,701 | B2 * | 9/2017 | Fritzsche | B64F 1/368 |
| 2008/0170934 | A1 | 7/2008 | Labadie | |
| 2015/0125249 | A1 * | 5/2015 | Joice | B65G 57/301 414/788.2 |
| 2019/0283983 | A1 * | 9/2019 | Fickler | B65G 59/061 |
| 2019/0352101 | A1 * | 11/2019 | Levine | B65D 19/385 |

FOREIGN PATENT DOCUMENTS

| | | |
|---|---|---|
| DE | 2417448 A1 | 10/1975 |
| EP | 0208029 A1 | 1/1987 |
| JP | S62289604 A | 12/1987 |
| JP | 2922788 B2 | 7/1999 |
| NL | 8204411 A | 6/1984 |
| WO | 9221598 A1 | 12/1992 |
| WO | 2015015439 A1 | 2/2015 |

OTHER PUBLICATIONS

Swedish Patent Office Search Report for Swedish Patent Application No. 1850629-5, dated No. 13, 2018 (3 pgs.).

* cited by examiner

AUTOMATIC LOADING OF TRAYS INTO CARTS

CROSS-REFERENCE TO RELATED APPLICATION

This application is related to and claims the benefit of priority to Swedish Patent Application No. 1850629-5, filed May 25, 2018, which is incorporated herein by reference in its entirety.

TECHNICAL FIELD

The present invention generally relates to carts/trolleys for holding trays, and more particularly to methods and devices for automatic loading of trays into such carts.

BACKGROUND

An airline meal, airline food, plane food or in-flight meal is a meal served to passengers on board a commercial airliner. These meals are prepared by specialist airline catering services and normally served to passengers using an airline service trolley/cart for transporting the trays inside the aircraft. Meals must generally be prepared on the ground before takeoff. The components of the meals are arranged on meals trays which are loaded into the service trolley/carts which are then brought onboard the aircraft. Without automation, the meal trays have to be loaded into the service carts by hand, a process which takes time and is stressful for the personnel. Automation of this process can save time and labour, which is desirable considering the airlines' tight departure schedules. Therefore, an arrangement for automatic loading of the trays should have a high operating speed, a reliable function and a simple construction. It is also desirable that the arrangement does not take up too much of the limited available space at the airport.

SUMMARY

It is an object to provide an apparatus and a method for automatic loading of trays into a cart/trolley. It is a particular object to provide an apparatus which has a simple construction, a reliable function and a high operating speed. It is another particular object to provide an apparatus which can be used together with conventional service carts for the airline industry.

These and other objects are met by embodiments of the proposed technology.

According to a first aspect, there is provided an apparatus for automatic loading of trays into a cart, where the cart is adapted to receive trays at different vertical tray levels. The apparatus comprises a lifting device configured to lift the cart from a floor to different vertical positions, and to lower the cart back to the floor, and a conveyer arrangement configured to transport the trays to the cart, where the conveyer arrangement is located adjacent to the lifting device. The conveyer arrangement comprises a loading surface configured to support the trays transported on the conveyer arrangement and a transport belt configured to transport the trays on the loading surface from a first end to a second end of the conveyer arrangement, where the second end is facing the lifting device. The conveyer arrangement further comprises at least one first tray stopper and at least one second tray stopper configured to, when activated, stop the movement of the trays on the loading surface at a first tray waiting position and at a second tray waiting position, respectively, and to allow the trays to pass the respective tray waiting positions when deactivated, where the second tray waiting position is located closer to the second end of the conveyer arrangement than the first tray waiting position. The conveyer arrangement also comprises a first tray sensor and a second tray sensor configured to detect trays passing the tray sensors, where the first tray sensor is located between the first end of the conveyer arrangement and the first tray waiting position, and the second tray sensor is located between the first tray waiting position and the second tray waiting position. The conveyer arrangement also comprises at least one tray level sensor configured to detect the tray levels in the cart, and a distance sensor configured to measure a horizontal distance between the cart and the second end of the conveyor arrangement.

According to a second aspect, there is provided a method for automatic loading of trays into a cart, where the cart is adapted to receive trays at different vertical tray levels. The method comprises a step of moving the cart into a lifting device configured to lift the cart from a floor to different vertical positions and to lower the cart back to the floor. The method also comprises a step of measuring, with a distance sensor, a horizontal distance between the cart and a second end of a conveyer arrangement configured to transport the trays to the cart, where the conveyer arrangement is located adjacent to the lifting device and comprises a loading surface and a transport belt which transports the trays on the loading surface from a first end to a second end of the conveyer arrangement, where the second end faces the lifting device. When the cart is within a predetermined horizontal distance from the second end of the conveyer arrangement, the method continues with a step of detecting a next tray level in the cart with a tray level sensor and a step of lifting the cart with the lifting device to a correct vertical position where the next tray level in the cart is at the same vertical level as the loading surface of the conveyer arrangement. When the cart is in a correct vertical position, the method continues with a step of detecting each tray passing a first tray sensor separately, with a first tray sensor located between the first end of the conveyer arrangement and a first tray waiting position where the trays are stopped on the loading surface.

When a predetermined number of trays have passed the first tray sensor the method continues with the steps of deactivating a first tray stopper to allow the predetermined number of trays to pass the first tray waiting position, and detecting the predetermined number of trays passing a second tray sensor, with a second tray sensor located between the first tray waiting position and a second tray waiting position where the trays are stopped on the loading surface, the second tray waiting position being located closer to the second end of the conveyer arrangement than the first tray waiting position. When the predetermined number of trays have passed the second tray sensor, the method continues with a step of activating the first tray stopper to stop subsequent trays at the first tray waiting position, a step of deactivating a second tray stopper to allow the predetermined number of trays to pass the second tray waiting position on the loading surface, a step of loading the predetermined number of trays into the current tray level, which is the tray level currently being at the same vertical level as the loading surface of the conveyer arrangement, and a step of activating the second tray stopper to stop subsequent trays at the second tray waiting position. When all tray levels of the cart have been loaded, the method finishes with the step of lowering the cart to the floor with the lifting device. If all tray levels of the cart have not been loaded, the method returns to the step of detecting a next tray level in the cart.

With an automatic tray loading apparatus according to the present disclosure, a meal cart for the flight industry can be loaded with meal trays significantly faster than manual loading.

Other advantages will be appreciated when reading the detailed description.

BRIEF DESCRIPTION OF THE DRAWINGS

The invention, together with further objects and advantages thereof, may best be understood by making reference to the following description taken together with the accompanying drawings, in which.

DETAILED DESCRIPTION

The present invention generally relates to carts/trolleys for holding trays, and more particularly to methods and devices for automatic loading of trays into such carts. Although the invention will be described mainly in relation to meal trays and service carts for the airline industry, the proposed technology can also be used for loading of other types of trays into carts within other fields of technology, where appropriate.

Throughout the drawings, the same reference designations are used for similar or corresponding elements.

As described in the background section, it is desirable to implement automatic loading of trays into carts since it can save time and labour. An arrangement for automatic loading of the trays should therefore have a high operating speed, a reliable function and a simple construction.

Considering the airline industry in particular, it is also desirable that the arrangement does not take up too much of the limited available space at the airport, and that it can be used together with conventional airline service carts.

Figure 1:
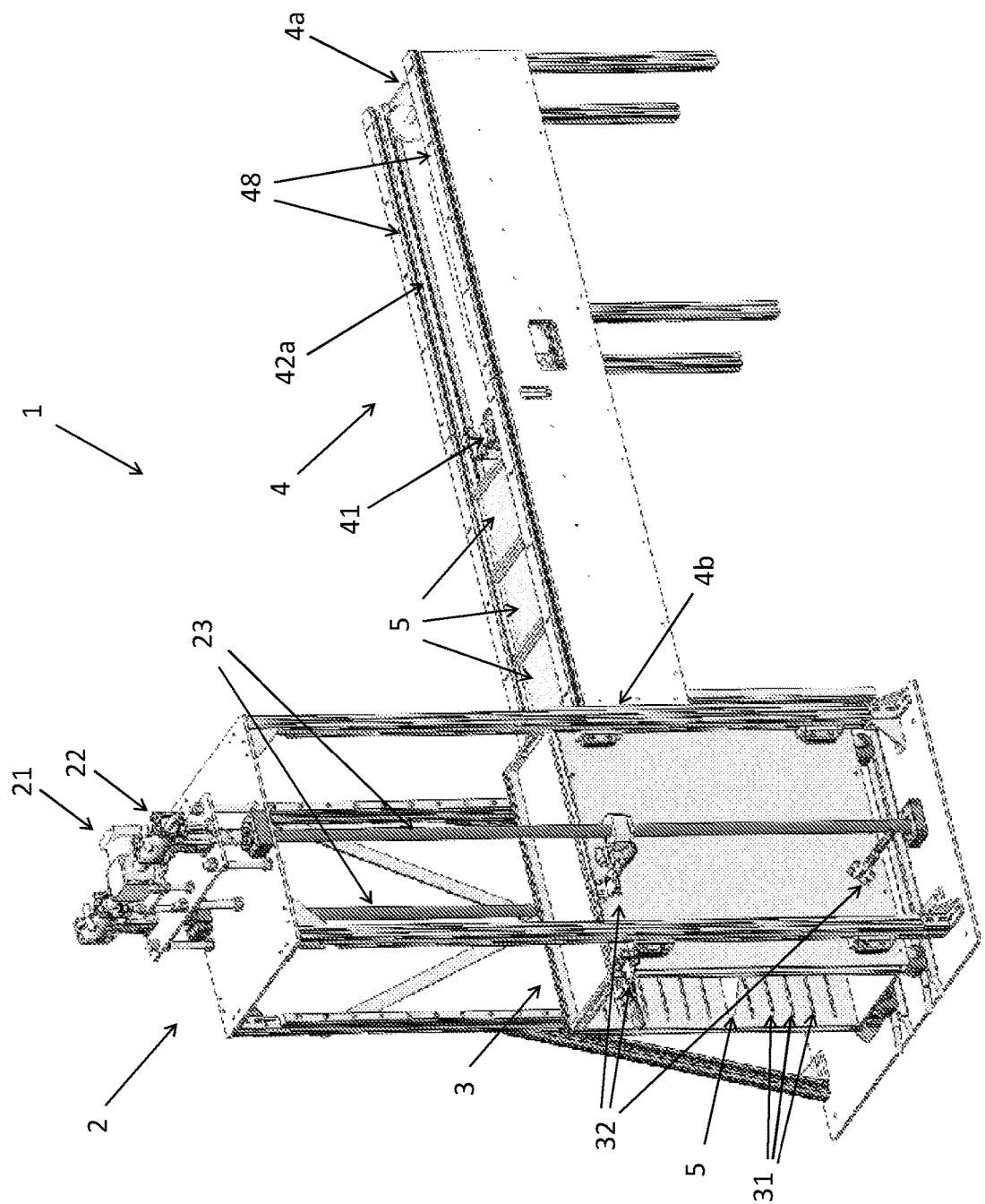
FIG. 1 is a schematic illustration of an apparatus for automatic loading of trays into a cart according to an embodiment of the present disclosure, and a cart.

These and other objects are met by embodiments of the proposed technology. FIG. 1 is a schematic illustration of an apparatus 1 for automatic loading of trays into a cart according to an embodiment of the present disclosure, together with a cart 3. The cart 3 and the trays 5 are of course not part of the apparatus 1 but are shown in the figure to illustrate the use of the apparatus together with a cart and trays. The apparatus 1 comprises a lifting device 2 configured to transport/lift/carry the cart 3 from the floor to different vertical positions and a conveyer arrangement 4 configured to transport the trays 5 to the cart 3, where the conveyer arrangement 4 is located adjacent to the lifting device 2. The lifting device 2 is also configured to lower the cart back to the floor and may in an embodiment comprise a motor 21 and a gear box 22 for moving the cart 3 basically vertically up and down, for example with the aid of ball screws 23. In another embodiment the lifting device may comprise e.g. a fork lift or similar. The conveyer arrangement 4 comprises a basically horizontal loading surface 48, supporting the trays transported on the conveyer arrangement 4. The loading surface 48 may in an embodiment consist of two parallel surfaces with a gap/space between them, thereby supporting the edges of the trays, as illustrated in FIG. 1. The conveyer arrangement also comprises a transport belt 42a which transports the trays 5 on the loading surface 48 towards the lifting device 2 and the cart 3, from a first end 4a of the conveyer arrangement 4 to a second end 4b of the conveyer arrangement 4, where the second end 4b is facing the lifting device 2 and the cart 3.

A cart according to standard is adapted to receive trays at different vertical tray levels 31, and is usually provided with tray guiding rails/runners on the inside for supporting the trays. There is usually a pair of guiding rails at each tray level, one rail at each side of the cart, and the trays are supported by the rails at the edges of the trays. Other types of carts may for example be provided with shelfs or similar at the tray levels.

Usually a cart is provided with wheels underneath and can therefore easily be rolled along the ground/floor. To start the loading of trays 5, the cart 3 is rolled on the floor towards the lifting device 2 and moved/pushed into the lifting device 2 towards the conveyer arrangement 4. This could be done manually in an embodiment, or automatically in another embodiment. When the cart 3 is in a correct horizontal position, i.e. such that the cart 3 is located at a predetermined horizontal distance from the second end 4b of the conveyer arrangement 4, the lifting device 2 can lift the cart 3 to different vertical positions such that the trays 5 can be loaded from the transport belt 42a into a tray level 31 of the cart 3, i.e. when a tray level 31 in the cart 3 is at the same vertical level as the loading surface 48 of the conveyer arrangement 4. In an embodiment the trays 5 are pushed inside the cart 3 with the aid of a tray pushing unit 41, which moves parallel with the loading surface 48 and the transport belt 42a. In a particular embodiment the lifting device 2 first lifts the cart 3 just above the ground/floor, so the wheels are not in contact with the floor, and the cart 3 can then be locked to the lifting device 2 with the aid of one or more latching devices 32 before the lifting continues. This ensures stability during the continued lifting, as well as correct and accurate vertical positioning of the cart 3 at the different vertical levels. The latching devices 32 may be operated manually in an embodiment or automatically in another embodiment.

Figure 2:
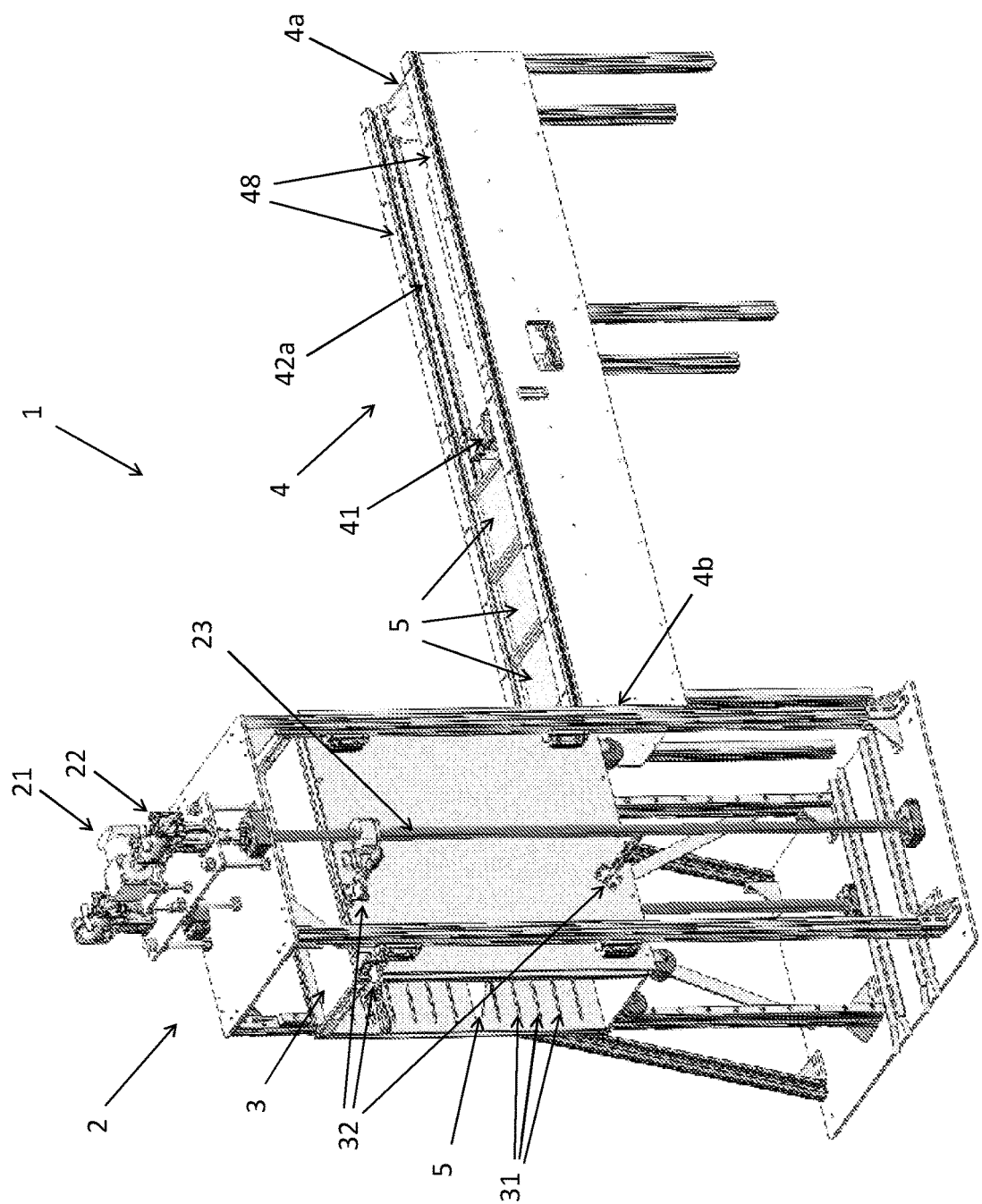
FIG. 2 is a schematic illustration of an apparatus for automatic loading of trays into a cart according to an embodiment of the present disclosure, and a cart.

FIG. 2 shows the automatic tray loading apparatus 1 and the cart 3 when the cart 3 has been lifted to its topmost position, i.e. a position where the lowest tray level of the cart 3 can be loaded. When the loading of the cart 3 is completed, i.e. when all tray levels 31 inside the cart 3 contain at least one tray 5, the cart 3 is lowered back to the floor by the lifting device 2.

Figure 3:
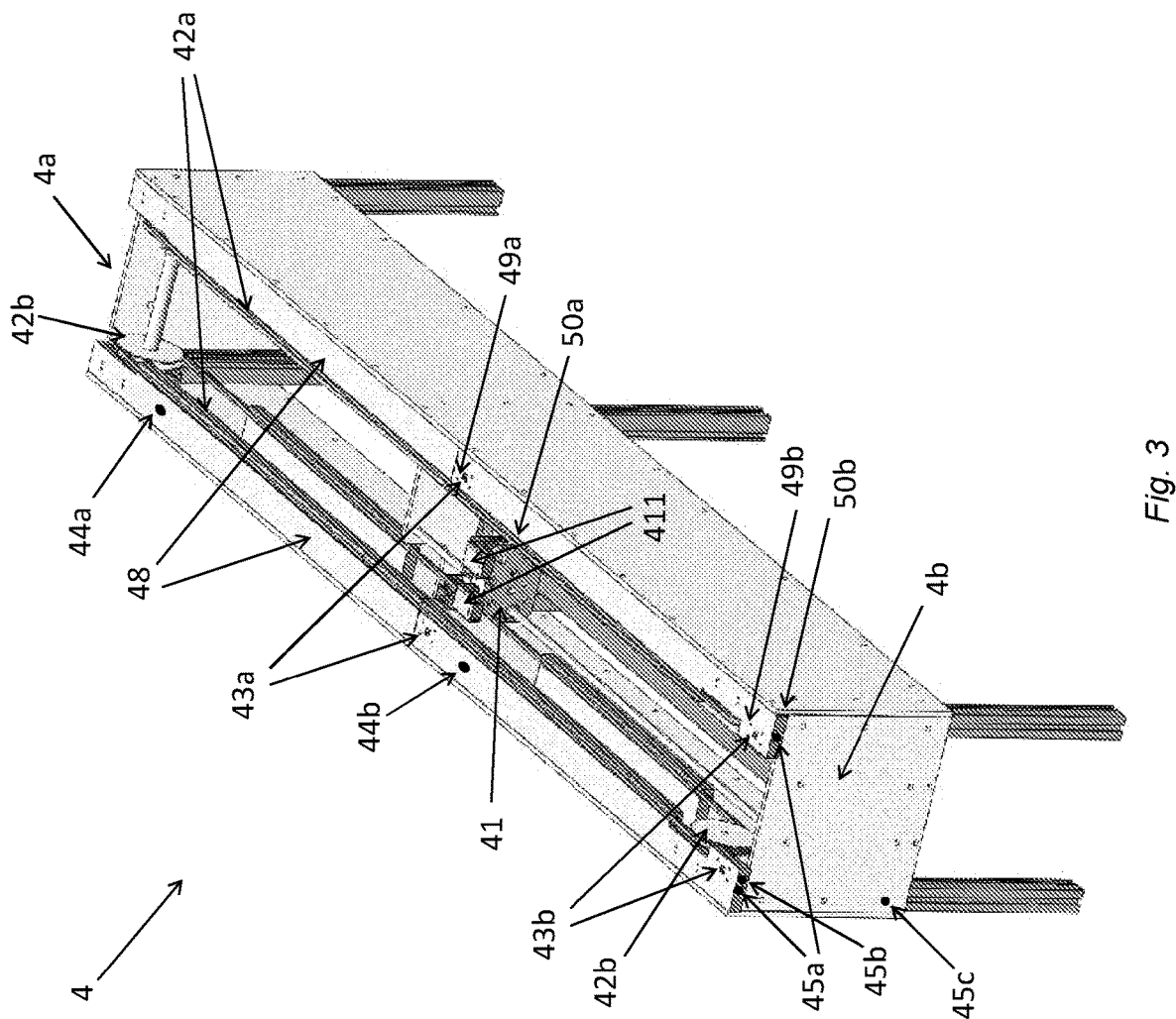
FIG. 3 is a schematic illustration of an embodiment of a tray conveyer arrangement of the apparatus of FIGS. 1 and 2.

FIG. 3 is a schematic illustration of an embodiment of the tray conveyer arrangement 4 of the apparatus 1 of FIGS. 1 and 2. As mentioned above, a transport belt 42a transports the trays (not shown in this figure) along the loading surface 48 in a forward direction, i.e. towards the second end 4b of the conveyer arrangement 4 facing the lifting device (not shown). In the figure, the forward direction is obliquely towards the viewer. In an embodiment the transport belt 42a is driven by a belt motor (not shown) and loops around a wheel/roller 42b at each end of the conveyer arrangement 4. The transport belt 42a may in an embodiment have a circular cross-section and run in a recessed track provided on the loading surface 48 of the conveyer arrangement 4. In an embodiment the conveyer arrangement 4 comprises two parallel transport belts 42a, for better stability/reliability, and then of course also two further wheels 42b. The transverse distance between the two transport belts 42a is in this case adapted so that the edges of the trays are resting on the belts.

The conveyer arrangement 4 also comprises one or more first tray stoppers 43a and second tray stoppers 43b, for stopping the movement of the trays on the loading surface 48 at a first tray waiting position 49a and at a second tray waiting position 49b, respectively, where the second tray waiting position 49b is located closer to the second end 4b of the conveyer arrangement 4 than the first tray waiting position 49a, i.e. the second tray waiting position 49b is located forwards of first tray waiting position 49a with respect to the transport direction of the transport belt 42a. The transport belt 42a normally moves continuously throughout the operation of the tray loading apparatus, and when trays are loaded onto the loading surface 48 the transport belt 42a transports the trays in the forward direction. When a tray stopper is activated, the movement of the trays will be stopped at a tray waiting position and the belt 42a will slide underneath the bottom surface of the trays, until the tray stopper is deactivated and the trays are again carried forward by the transport belt 42a. In an embodiment a tray stopper 43a, 43b may be implemented in the form of a rod/bar which is positioned in the travelling path of the trays. When activated, the rod/bar is elevated above the loading surface 48 to obstruct the path of the trays, and when deactivated the rod/bar is lowered below the loading surface 48 to allow the trays to pass. In this case, the first 49a and second 49b tray waiting positions coincide with the positions of the first 43a and second 43b tray stoppers, respectively. The first 43a and second 43b tray stoppers may be operated by step motors in an embodiment, but may also be operated by compressed air or by some other suitable means of operation. Step motors have the advantage of being more silent than compressed air.

The conveyer arrangement 4 also comprises a first tray sensor 44a and a second tray sensor 44b, where the second tray sensor 44b is located closer to the second end 4b of the conveyer arrangement 4 than the first tray sensor 44a, i.e. the second tray sensor 44b is located forwards of first tray sensor 44a with respect to the transport direction of the transport belt 42a. As seen in FIG. 3 he first tray sensor 44a is located between the first end 4a of the conveyer arrangement 4 and the first tray waiting position 49a, and the second tray sensor 44b is located between the first tray waiting position 49a and the second tray waiting position 49b. The tray sensors 44a, 44b are configured to detect trays that are passing the sensors. This may in an embodiment be accomplished by detecting the space between trays, for example by using conductive sensors that sense the difference in conductivity between the trays, which are usually made of some kind of plastic, and the air when there is a space between the trays. The conductive sensors may in an embodiment be provided on the loading surface 48 of the conveyer arrangement 4. The detection of trays will be used for controlling the operation of the tray stoppers 43a and 43b.

When the tray loading apparatus begins operation and the transport belt 42a is empty of trays, both tray stoppers 43a, 43b are activated. Trays loaded onto the loading surface 48 of the conveyer arrangement 4 are transported forwards by the transport belt 42a but will be stopped by the first tray stopper 43a at the first tray waiting position 49a. While moving towards the first tray waiting position 49a, each tray is detected separately by the first tray sensor 44a when passing that sensor. The tray loading apparatus is configured to count the number of trays passing the first tray sensor 44a, and when a predetermined number of trays have passed the first tray sensor 44a, the first stopper 43a is deactivated to allow the trays to pass the first tray waiting position 49a. In order for the first tray sensor 44a to be able to detect each tray separately, there must be a space between the trays, as described above. Therefore, if the trays are e.g. loaded from a preceding conveyor or transport belt, the speed of the transport belt 42a must exceed the speed of the preceding belt. The speed of the transport belt 42a is therefore adjustable in an embodiment. The predetermined number of trays is the number of trays that will fit on a vertical tray level in the cart and depends on the size of the trays and how the cart is configured. A standard cart for the flight industry usually has room for 2 or 3 trays on each tray level, depending on the size of the trays. This number can therefore be configured in an embodiment.

After being allowed to pass the first tray waiting position 49a the trays are again transported forwards by the transport belt 42a but will be stopped by the second tray stopper 43b at the second tray waiting position 49b. While moving towards the second tray waiting position 49b, the trays are detected by the second tray sensor 44b when passing that sensor. Since the trays were pushed together by the transport belt 42a when being stopped at the first tray waiting position 49a, the trays are now travelling without space between them and so the second tray sensor 44b will detect the trays as a unit. When the trays have passed the second tray sensor 44b the first tray stopper 43a is again activated to be able to stop the next batch of trays arriving at the first tray waiting position 49a.

The trays are now waiting at the second tray waiting position 49b to be loaded into the cart. Before they can enter the cart, the cart has to be at a correct vertical position such that the trays can be loaded from the transport belt 42a into a tray level 31 of the cart, i.e. where a tray level in the cart is at the same vertical level as the loading surface 48 of the conveyer arrangement 4. Thus, the tray loading apparatus also comprises one or more level sensors configured to detect the tray levels in the cart. If a tray level is at the same vertical level as the loading surface 48, the cart is in a correct vertical position and the second tray stopper 43b is deactivated to allow the trays to be loaded into the cart. If there is no tray level at the same vertical level as the loading surface 48, the lifting device continues to lift the cart. The level sensors may in an embodiment be laser sensors. In such an embodiment, the laser sensor or sensors may be positioned such that the laser beam hits e.g. the tray guiding rails or shelfs or similar at the tray levels of the cart, when the cart is at the correct vertical position. If the cart is not in a correct vertical position, the laser beam does not hit anything within a certain distance. In the embodiment illustrated in FIG. 3, one or more level sensors 45a in the form of laser sensors may be provided at the second end 4b of the conveyer arrangement 4, with the laser beam or beams directed towards the cart. The level sensor or sensors 45a may be positioned at a vertical position near the loading surface 48 or at the same level as the loading surface 48, and the laser beam or beams may be directed substantially horizontally in an embodiment, or tilted vertically with an angle depending on the vertical position of the sensor, e.g. if the sensor is positioned below the loading surface 48 it may be necessary to tilt the beam slightly upwards in order to detect a tray level. In an embodiment, in particular for loading a cart with guiding rails, two level sensors 45a may be positioned at a horizontal position near the outer edges of the loading surface 48 with a horizontal spacing substantially the same as the spacing between the tray guiding rails of a cart, and the laser beams may be directed substantially parallel with the loading surface 48 in the horizontal direction, or tilted horizontally with an angle depending on the exact horizontal positions of the sensors.

A cart should preferably be completely empty before it is subject to loading. However, on some occasions there may be one or more trays left in the cart due to unusual circumstances. Therefore, the tray loading apparatus may in some embodiments also comprise a tray detector configured to detect whether a tray level in the cart is empty before loading the trays into that level. If the tray level is empty, the second tray stopper 43b is deactivated to allow the trays to be loaded into that level, but if there is one or more trays already present at a tray level, the cart is instead lifted to a next tray level and that level is checked for trays. Thus, such an embodiment comprises both level sensor(s) configured to detect when the cart has reached a correct vertical position and a tray detector configured to detect whether a tray level in the cart is empty. The tray detector may in an embodiment be a laser sensor. In such an embodiment, the laser sensor may be positioned such that the laser beam can hit a tray which is present at a tray level. If there is no tray, the laser beam does not hit anything within a certain distance. In the embodiment illustrated in FIG. 3, a tray detector 45b in the form of a laser sensor may be provided at the second end 4b of the conveyer arrangement 4, with the laser beam directed towards the cart. The tray detector 45b may be positioned at a vertical position near the loading surface 48 or at the same level as the loading surface 48, and the laser beam may be directed substantially horizontally in an embodiment, or tilted vertically with an angle depending on the vertical position of the sensor, e.g. if the sensor is positioned below the loading surface 48 it may be necessary to tilt the beam slightly upwards in order to detect trays present at the tray level.

As mentioned above, the cart 3 needs to be in a correct horizontal position, i.e. located at a predetermined distance from the conveyer arrangement 4, before the lifting device 2 starts lifting the cart. The distance needs to be sufficiently small so that the trays can be loaded into the cart and not fall down between the conveyer arrangement 4 and the cart, i.e. the distance must at least be smaller than the length of the trays, and preferably much smaller. Therefore, the tray loading apparatus also comprises at least one distance sensor configured to detect when the cart is within the predetermined distance from the second end (4b) of the conveyor arrangement 4. The distance sensor may in an embodiment be a laser sensor. In the embodiment illustrated in FIG. 3, a distance sensor 45c in the form of a laser sensor may be provided at the second end 4b of the conveyer arrangement 4, with the laser beam directed towards the cart 3, measuring the distance between the conveyer arrangement 4 and the cart 3. When the distance is less than the predetermined distance, the lifting device can start lifting the cart.

In FIG. 3 the sensors 45a, 45b and 45c are illustrated as being provided on the end surface of the second end 4b of the conveyer arrangement 4, but they may also be placed elsewhere on the tray loading apparatus, as long as their placement is suitable for the described function of the sensors.

Figure 4:
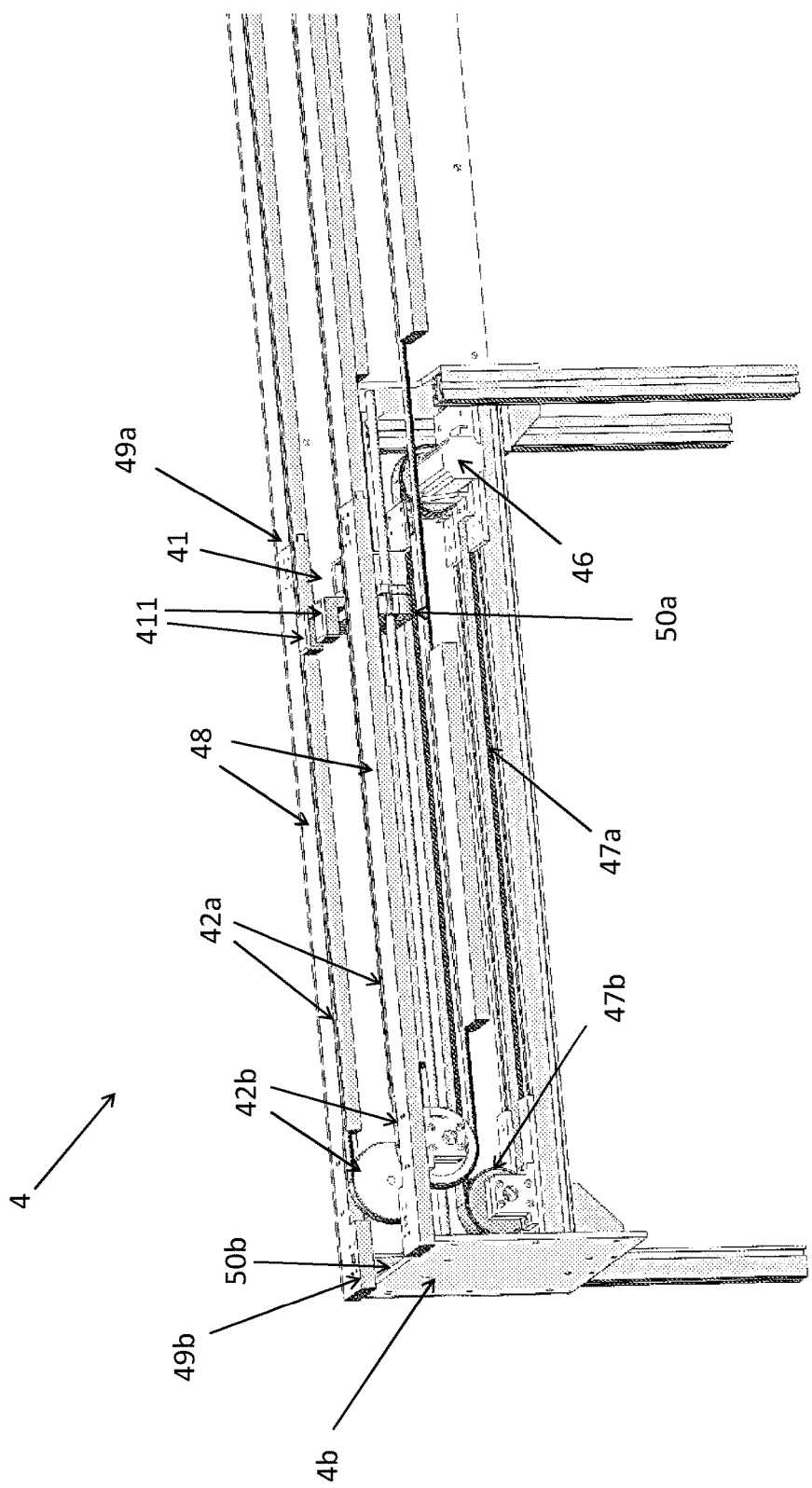
FIG. 4 is a schematic illustration of a part of the tray conveyer arrangement of FIG. 3 where side covers have been removed.
Figure 5:
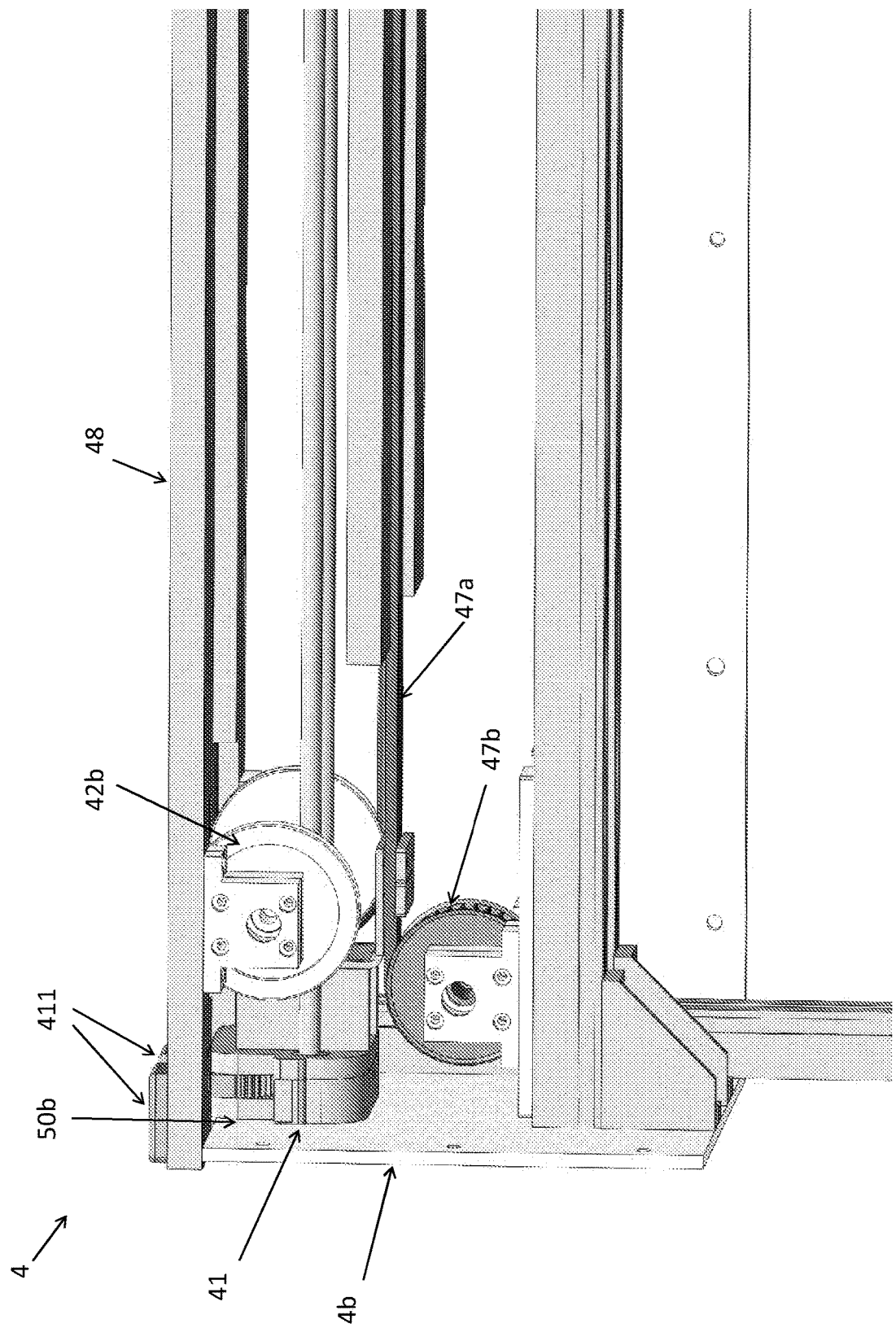
FIG. 5 is a more detailed illustration of parts of the tray conveyer arrangement of FIG. 3 where side covers have been removed.
Figure 6:
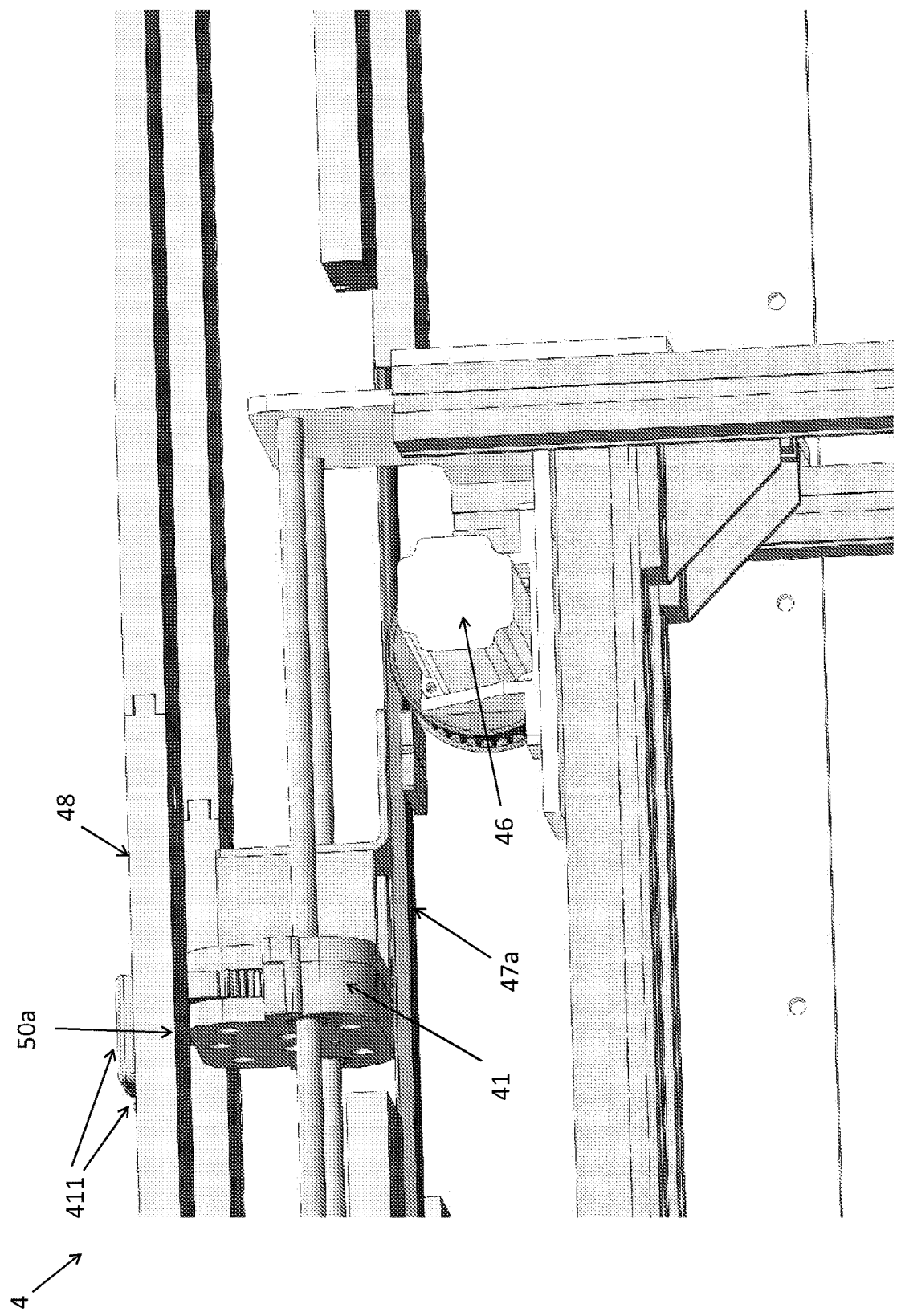
FIG. 6 is a more detailed illustration of other parts of the tray conveyer arrangement of FIG. 3 where side covers have been removed.

FIG. 4 is a schematic illustration of a part of the tray conveyer arrangement of FIG. 3 where side covers have been removed. As mentioned above, the trays may in an embodiment be pushed inside the cart with the aid of a tray pushing unit 41, which moves parallel with the loading surface 48 and the transport belt 42a. The tray pushing unit 41 moves in an embodiment with the aid of a driving belt 47a which is driven by a belt motor 46 and loops around a wheel/roller 47b, as also shown in FIG. 5, which is a more detailed illustration of parts of the tray conveyer arrangement 4 where side covers have been removed. The tray pushing unit 41 can move between a first end position 50a and a second end position 50b, where the second end position 50b is located closer to the second end 4b of the conveyer arrangement 4 than the first end position 50a, i.e. the first end position 50a is a rear/posterior position with respect to the transport direction of the transport belt 42a and the second end position 50b is a forward position with respect to the transport direction of the transport belt 42a. The first end position 50a is also located forward of the first tray waiting position 49a for the trays, as illustrated in FIGS. 3-4, but must be located further away from the second end 4b of the conveyer arrangement 4 than the total/aggregated width of the predetermined number of trays, to be able to reach behind the trays and push the trays into the cart 3. The tray pushing unit 41 is shown in FIG. 5 at its second end position 50b which is located at the second end 4b of the conveyer arrangement 4, as illustrated in FIGS. 3-5. FIG. 6 is a more detailed illustration of other parts of the tray conveyer arrangement 4 where side covers have been removed, and where the tray pushing unit 41 is instead shown in its first end position 50a. Also FIGS. 3-4 shows the tray pushing unit 41 in its first end position.

Figure 7A:
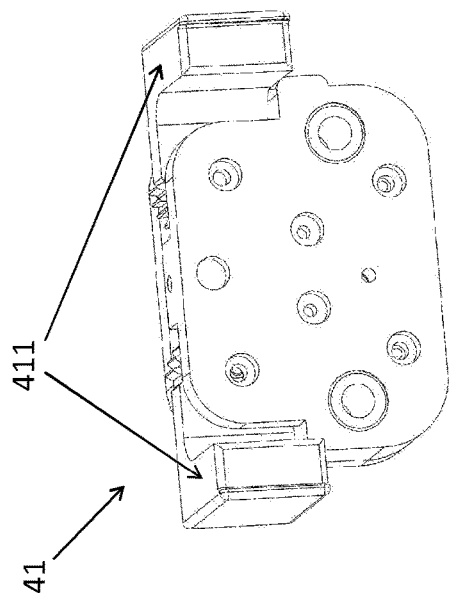
FIGS. 7a-7d are detailed illustrations of an embodiment of a tray pushing unit which is part of the tray conveyer arrangement of FIG. 3.
Figure 7B:
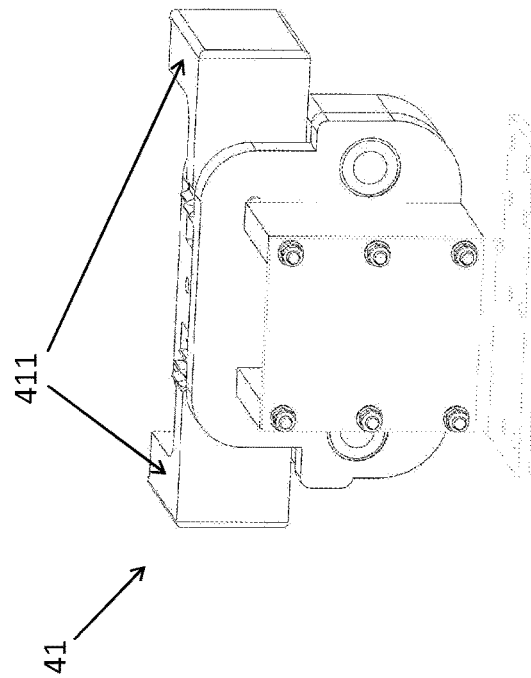
Figure 7C:
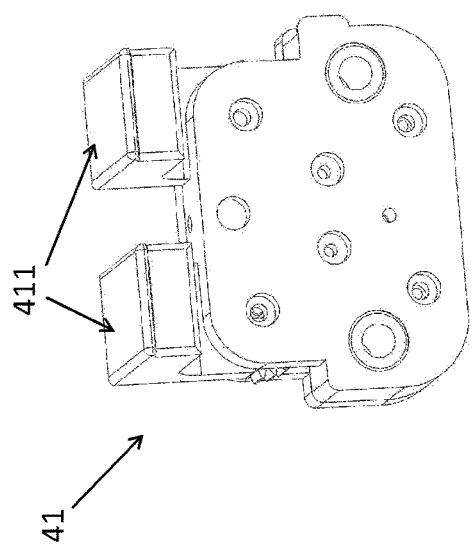
Figure 7D:
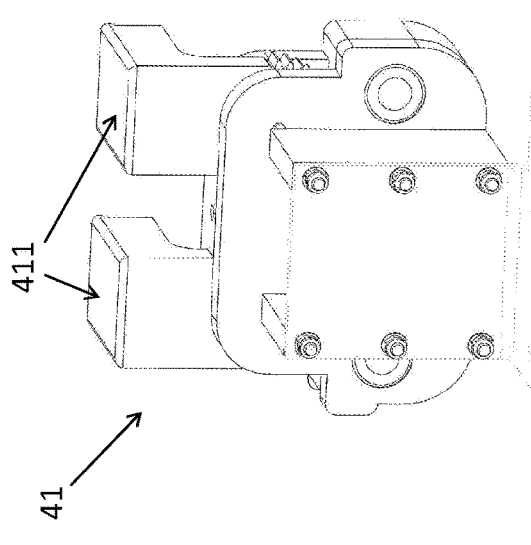

As indicated in FIGS. 3-6 the tray pushing unit 41 has foldable/retractable protrusions or arms 411 that are configured such that when the arms 411 are retracted the arms 411 and thereby the entire tray pushing unit 41 are located beneath the loading surface 48, and when the arms 411 are extended the arms reach above the loading surface 48. Thus, when the arms 411 of the tray pushing unit 41 are extended they will be able to reach the edges of the trays located on the loading surface 48 so that the tray pushing unit 41 can push the trays into the cart. FIGS. 7a-7d are more detailed illustrations of an embodiment of a tray pushing unit 41 which is part of the tray conveyer arrangement 4. FIGS. 7a and 7c show the tray pushing unit 41 with the arms 411 extended, from a forward view and from a rear view, respectively, whereas FIGS. 7b and 7d show the tray pushing unit 41 unit 41 with the arms 411 retracted, from a forward view and from a rear view, respectively.

While trays are transported forwards by the transport belt 42a on the loading surface 48 between the first tray waiting position 49a and the second tray waiting position 49b, the tray pushing unit will wait at the first end position 50a with its arms 411 retracted, so the trays can pass over the tray pushing unit 41 without obstruction. When the cart is ready for loading, i.e. when the level sensor or sensors 45a have detected that the cart is in a correct vertical position, and optionally also when the tray detector 45b has detected that the current tray level is empty of trays, the second tray stopper 43b is deactivated, the tray pushing unit 41 extends its arms 411 and moves forwards, and the arms 411 will push the trays into the cart at the current tray level. When reaching the second end position 50*b*, the tray pushing unit 41 retracts its arms 411 and moves backwards to its first end position 50*a*, and the second tray stopper 43*b* is again activated to be able to stop the next batch of trays moving towards the second tray waiting position 49*b*. Since the arms are retracted, any trays being transported on the loading surface 48 between the first tray waiting position 49*a* and the second tray waiting position 49*b* will not be disturbed by the backwards-moving tray pushing unit 41.

The loading of trays into the cart continues until all tray levels in the cart contain at least one tray, and then the cart is lowered back to the floor by the lifting device. The number of tray levels can be pre-configured in an embodiment, or in another embodiment the tray loading apparatus can determine the number of tray levels automatically. As an example, the tray loading apparatus can measure the spacing between the tray levels, and abort the loading when the cart has been lifted a distance exceeding this spacing without the tray loading apparatus detecting a next tray level.

Figure 8:
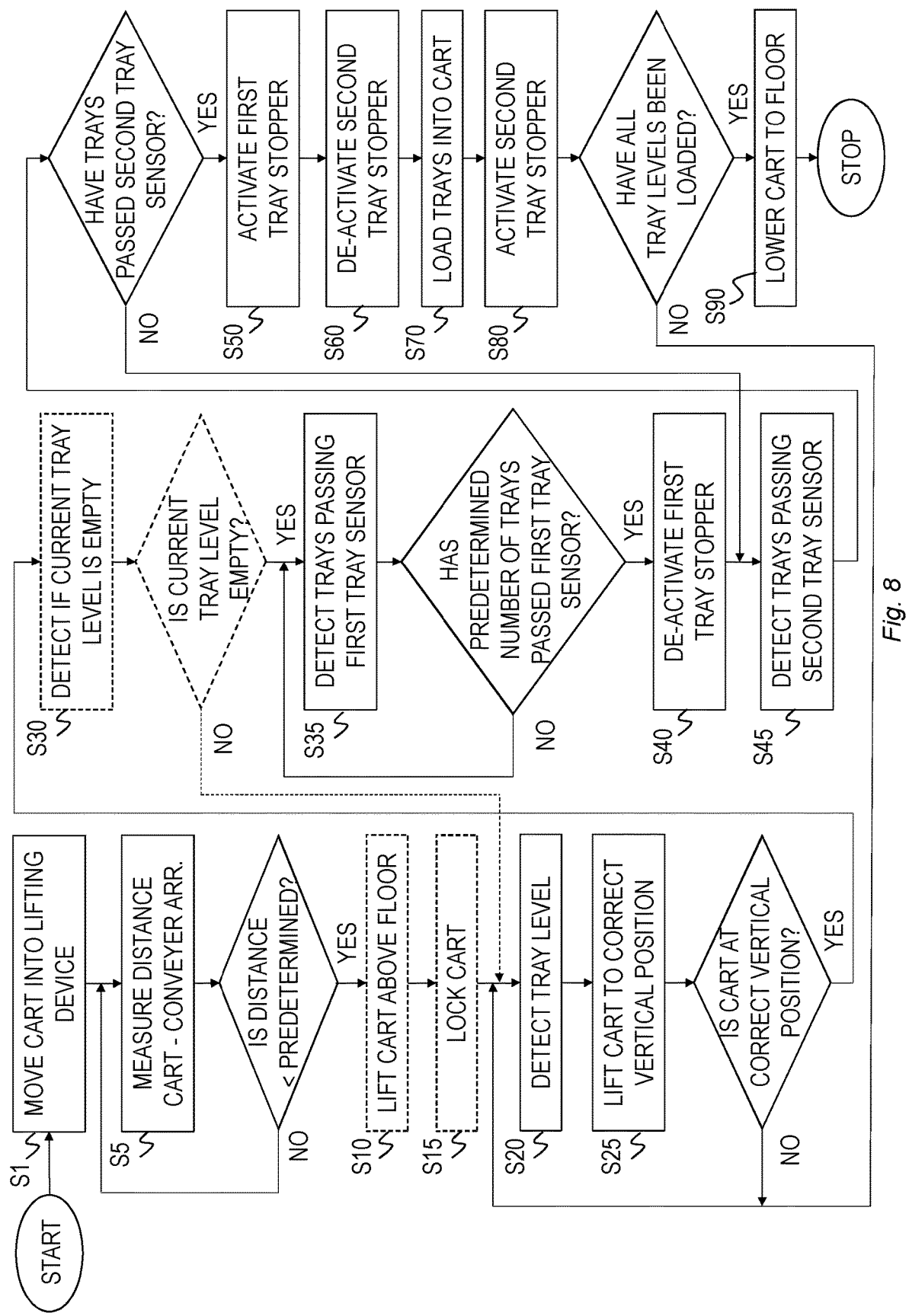
FIG. 8 is a schematic flow diagram illustrating an example of a method for automatic loading of trays into a cart according to an embodiment of the present disclosure.

FIG. 8 is a schematic flow diagram illustrating an example of a method for automatic loading of trays into a cart adapted to receive trays at different vertical tray levels according to an embodiment of the present disclosure. As described above, the method starts with a step S1 of moving the cart into the lifting device. This can be done either manually or automatically. The method then continues with a step S5 of measuring a horizontal distance between the cart and the second end of the conveyer arrangement with a distance sensor. Once the cart is located within a predetermined horizontal distance from the second end of the conveyer arrangement, the method continues with a step S20 of detecting a next tray level in the cart with a tray level sensor, a step S25 of lifting the cart with the lifting device to a correct vertical position where the next tray level in the cart is at the same vertical level as the loading surface of the conveyer arrangement. When the cart is at a correct vertical position the method continues with a step S35 of detecting each tray passing the first tray sensor separately, with a first tray sensor located between the first end of the conveyer arrangement and a first tray waiting position where the trays are stopped on the loading surface, i.e. the trays are counted as separate units. When a predetermined number of trays have passed the first tray sensor the method continues with a step S40 of deactivating a first tray stopper to allow the trays to pass the first tray waiting position. The method continues with a step S45 of detecting the predetermined number of trays passing a second tray sensor, with a second tray sensor located between the first tray waiting position and a second tray waiting position where the trays are stopped on the loading surface, where the second tray waiting position is located closer to the second end of the conveyer arrangement than the first tray waiting position. As described above, the trays travel towards the first tray waiting position as separate units but are pushed together by the transport belt when waiting at the first tray waiting position, and therefore they continue after the first tray waiting position as a batch/unit. Therefore, they are detected as a unit by the second tray sensor in an embodiment. When the predetermined number of trays have passed the second tray sensor, the method continues with a step S50 of activating the first tray stopper to stop subsequent trays at the first tray waiting position, a step S60 of deactivating the second tray stopper to allow the predetermined number of trays to pass the second tray waiting position on the loading surface, a step S70 of loading the predetermined number of trays into the current tray level, i.e. the tray level currently being at the same vertical level as the loading surface of the conveyer arrangement, and a step S80 of activating the second tray stopper to stop subsequent trays at the second tray waiting position. When all tray levels of the cart have been loaded, the method finishes with a step S90 of lowering the cart to the floor with the lifting device, otherwise the method loops back to the step S20 of detecting a next tray level in the cart.

As illustrated in FIG. 8 with dashed lines, the method may in an embodiment comprise an optional step S10 of lifting the cart just above the floor with the lifting device, followed by a step S15 of locking the cart to the lifting device, before proceeding to the step S20 of detecting a next tray level in the cart. The step S15 of locking the cart to the lifting device can either be done manually or automatically.

As further illustrated in FIG. 8 with dashed lines, the method may in an embodiment also comprise an optional step S30 of detecting whether the current tray level is empty of trays, with a tray detector. If the current tray level is empty of trays, the method proceeds to the step S35 of detecting each tray passing the first tray sensor separately, and continues from there. If the current tray level is not empty of trays, the method returns to the step S20 of detecting a next tray level in the cart, and continues from there.

Some of the steps may be performed simultaneously, and some may be performed in a different order than described above when appropriate, but of course each prerequisite for performing a step needs to be fulfilled.

The tray loading apparatus according to the present embodiments can be used together with conventional service carts for the airline industry. It has a relatively simple construction and simple components which results in a reliable function. Instead of lifting the entire conveyer arrangement, only the cart is lifted which is a much simpler operation, and there is no need for special fixtures for the trays since they travel "as is" on the conveyer. The tray loading apparatus also has a high operating speed; a standard meal cart for the airline industry contains 13 tray levels and can be loaded in less than 2 minutes with the tray loading apparatus according to the present embodiments. This is a significant improvement compared to manual loading of meal trays into meal carts for the airline industry.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. An apparatus (1) for automatic loading of trays (5) into a cart (3), the cart (3) being adapted to receive trays (5) at different vertical tray levels (31), the apparatus (1) comprising
   a lifting device (2) configured to lift the cart (3) from a floor to different vertical positions, and to lower the cart (3) back to the floor;
   a conveyer arrangement (4) configured to transport the trays (5) to the cart (3), the conveyer arrangement (4) being located adjacent to the lifting device (2) and comprising:
      a loading surface (48) configured to support the trays (5) transported on the conveyer arrangement (4);

a transport belt (42a) configured to transport the trays (5) on the loading surface (48) from a first end (4a) to a second end (4b) of the conveyer arrangement (4), the second end (4b) facing the lifting device (2);

at least one first tray stopper (43a) and at least one second tray stopper (43b) configured to, when activated, stop the movement of the trays on the loading surface (48) at a first tray waiting position (49a) and at a second tray waiting position (49b), respectively, and to allow the trays to pass the respective tray waiting positions (49a, 49b) when deactivated, the second tray waiting position (49b) being located closer to the second end (4b) of the conveyer arrangement (4) than the first tray waiting position (49a);

a first tray sensor (44a) and a second tray sensor (44b) configured to detect trays (5) passing the tray sensors (44a, 44b), the first tray sensor (44a) being located between the first end (4a) of the conveyer arrangement (4) and the first tray waiting position (49a), and the second tray sensor (44b) being located between the first tray waiting position (49a) and the second tray waiting position;

at least one tray level sensor (45a) configured to detect the tray levels (31) in the cart (3);

a distance sensor (45c) configured to measure a horizontal distance between the cart (3) and the second end (4b) of the conveyor arrangement (4); and a tray pushing unit (41) configured to push the trays (5) into the cart (3);

wherein the tray pushing unit (41) is configured to move parallel with the loading surface (48) and the transport belt (42a) between a first end position (50a) and a second end position (50b), the second end position (50b) being located at the second end (4b) of the conveyer arrangement (4) and the first end position (50a) being located between the first tray waiting position (49a) and the second end position (50b), and further away from the second end (4b) of the conveyer arrangement (4) than an aggregated width of the predetermined number of trays (5), the tray pushing unit (41) comprising:

retractable arms (411) configured such that when the arms (411) are retracted the arms (411) are located beneath the loading surface (48), and when the arms (411) are extended the arms (411) reach above the loading surface (48), thereby enabling the arms (411) to reach the edges of the trays (5) on the loading surface (48), and the tray pushing unit (41) to push the trays (5) into the cart (3).

2. The apparatus (1) according to claim 1, wherein the level sensors (45a) are laser sensors.

3. The apparatus (1) according to claim 1, wherein the distance sensor (45c) is a laser sensor.

4. The apparatus (1) according to claim 1, further comprising a tray detector (45b) configured to detect whether a tray level (31) in the cart (3) is empty.

5. The apparatus (1) according to claim 4, wherein the tray detector (45b) is a laser sensor.

6. The apparatus (1) according to claim 1, wherein the predetermined number of trays (5) can be configured.

7. The apparatus (1) according to claim 1, wherein the tray sensors (44a, 44b) are conductive sensors.

8. The apparatus (1) according to claim 1, wherein each of the first (43a) and second (43b) tray stoppers comprises a rod being positioned in the travelling path of the trays (5), the rod being elevated above the loading surface (48) to obstruct the path of the trays (5) at the respective waiting position (49a, 49b) when a respective tray stopper (43a, 43b) is activated, and lowered below the loading surface (48) to allow the trays (5) to pass the respective waiting position (49a, 49b) when a respective tray stopper (43a, 43b) is deactivated.

9. The apparatus (1) according to claim 1, wherein the tray stoppers (43a, 43b) are driven by step motors.

10. The apparatus (1) according to claim 1, wherein the transport belt (42a) has a circular cross-section.

11. The apparatus (1) according to claim 1, wherein the transport belt (42a) has an adjustable speed.

12. The apparatus (1) according to claim 1, further comprising latching devices configured to lock the cart (3) to the lifting device (2).

13. A method for automatic loading of trays (5) into a cart (3), the cart (3) being adapted to receive trays (5) at different vertical tray levels (31), the method comprising:

moving (S1) the cart (3) into a lifting device (2) configured to lift the cart (3) from a floor to different vertical positions and to lower the cart (3) back to the floor;

measuring (S5), with a distance sensor (45c), a horizontal distance between the cart (3) and a second end (4b) of a conveyer arrangement (4) configured to transport the trays (5) to the cart (3), the conveyer arrangement (4) being located adjacent to the lifting device (2) and comprising a loading surface (48) and a transport belt (42a) which transports the trays (5) on the loading surface (48) from a first end (4a) to a second end (4b) of the conveyer arrangement (4), the second end (4b) facing the lifting device (2);

when the cart (3) is within a predetermined horizontal distance from the second end (4a) of the conveyer arrangement (4), detecting (S20) a next tray level (31) in the cart (3) with a tray level sensor (45a);

lifting (S25) the cart (3) with the lifting device (2) to a correct vertical position where the next tray level (31) in the cart (3) is at the same vertical level as the loading surface (48) of the conveyer arrangement (4);

when the cart (3) is at a correct vertical position, detecting (S35) each tray (5) passing a first tray sensor (44a) separately, with a first tray sensor (44a) located between the first end (4a) of the conveyer arrangement (4) and a first tray waiting position (49a) where the trays (5) are stopped on the loading surface (48);

when a predetermined number of trays (5) have passed the first tray sensor (44a), deactivating (S40) a first tray stopper (43a) to allow the predetermined number of trays (5) to pass the first tray waiting position (49a);

detecting (S45) the predetermined number of trays (5) passing a second tray sensor (44b), with a second tray sensor (44b) located between the first tray waiting position (49a) and a second tray waiting position (49b) where the trays (5) are stopped on the loading surface (48), the second tray waiting position being located closer to the second end (4b) of the conveyer arrangement (4) than the first tray waiting position (49a);

when the predetermined number of trays (5) have passed the second tray sensor (44b), activating (S50) the first tray stopper (43a) to stop subsequent trays (5) at the first tray waiting position (49a);

deactivating (S60) a second tray stopper (43b) to allow the predetermined number of trays (5) to pass the second tray waiting position (49b) on the loading surface (48);

loading (S70) the predetermined number of trays (5) into the current tray level (31), which is the tray level (31) currently being at the same vertical level as the loading surface (48) of the conveyer arrangement (4), by moving a tray pushing unit (41) parallel with the loading surface (48) and the transport belt (42a) between a first end position (50a) and a second end position (50b), the second end position (50b) being located at the second end (4b) of the conveyer arrangement (4) and the first end position (50a) being located between the first tray waiting position (49a) and the second end position (50b), and further away from the second end (4b) of the conveyer arrangement (4) than an aggregated width of the predetermined number of trays (5), the tray pushing unit (41) comprising: retractable arms (411) configured such that when the arms (411) are retracted the arms (411) are located beneath the loading surface (48), and when the arms (411) are extended the arms (411) reach above the loading surface (48), thereby enabling the arms (411) to reach the edges of the trays (5) on the loading surface (48), and the tray pushing unit (41) to push the trays (5) into the cart (3);

activating (S80) the second tray stopper (43b) to stop subsequent trays (5) at the second tray waiting position (49b);

when all tray levels (31) of the cart (3) have been loaded, lowering (S90) the cart (3) to the floor with the lifting device (2);

if all tray levels (31) of the cart (3) have not been loaded, returning to detecting (S20) a next tray level (31) in the cart (3).

14. The method of claim 13, further comprising:

when the cart (3) is within a predetermined distance from the second end (4a) of the conveyer arrangement (4), lifting (S10) the cart (3) above the floor with the lifting device (2);

locking (S15) the cart (3) to the lifting device (2);

before proceeding to detecting (S20) a next tray level (31) in the cart (3).

15. The method of claim 13, further comprising:

detecting (S30), with a tray detector (45b) whether the current tray level (31) is empty of trays (5);

if the current tray level (31) is empty of trays (5), proceeding to detecting (S35) each tray (5) passing the first tray sensor (44a) separately, if the current tray level (31) is not empty of trays (5), returning to detecting (S20) a next tray level (31) in the cart (3).

* * * * *